United States Patent
Seyvet et al.

(10) Patent No.: US 11,689,284 B2
(45) Date of Patent: *Jun. 27, 2023

(54) CONTROLLING COMMUNICATIONS BETWEEN VISIBLE LIGHT COMMUNICATION ACCESS POINTS AND USER EQUIPMENTS

(71) Applicant: Telefonaktiebolaget LM Ericsson (publ), Stockholm (SE)

(72) Inventors: Nicolas Seyvet, Kista (SE); Hongxin Liang, Upplands Väsby (SE); Keven Wang, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/218,225

(22) Filed: Mar. 31, 2021

(65) Prior Publication Data
US 2021/0218470 A1 Jul. 15, 2021

Related U.S. Application Data

(63) Continuation of application No. 16/313,085, filed as application No. PCT/EP2016/065261 on Jun. 30, 2016, now Pat. No. 10,998,971.

(51) Int. Cl.
*H04B 10/116* (2013.01)
*H04B 10/114* (2013.01)

(52) U.S. Cl.
CPC ....... *H04B 10/116* (2013.01); *H04B 10/1149* (2013.01); *H04B 10/114* (2013.01); *H04B 10/1141* (2013.01)

(58) Field of Classification Search
None
See application file for complete search history.

(56) References Cited

U.S. PATENT DOCUMENTS

| 8,380,081 B2 * | 2/2013 | Kim | H04W 72/54 |
| | | | 398/154 |
| 8,428,469 B2 * | 4/2013 | Kim | H04W 72/51 |
| | | | 398/127 |

(Continued)

FOREIGN PATENT DOCUMENTS

| CN | 103873146 A | 6/2014 |
| CN | 105530049 A | 4/2016 |

OTHER PUBLICATIONS

Office Action including English summary for Chinese Patent Application No. 201680086327.2 dated Apr. 28, 2021.

(Continued)

*Primary Examiner* — Jai M Lee
(74) *Attorney, Agent, or Firm* — Sage Patent Group

(57) ABSTRACT

A coordination node can be configured to control communications between Visible Light Communication, VLC, Access Points, APs, and user equipments, UEs. The coordination node can: identify occurrence of an event relating to operation of a first VLC AP; determine that a second VLC AP and a third VLC AP each have communication coverage areas that are at least partially within a communication coverage area of the first VLC AP; control the second VLC AP to avoid it interfering with communications between the first VLC AP and a UE while it is within a common communication coverage area of the first VLC AP and the second VLC AP; and control the third VLC AP to avoid it interfering with communications between the first VLC AP and the UE while it is within a common communication coverage area of the first VLC AP and the second VLC AP.

20 Claims, 8 Drawing Sheets

(56) References Cited

U.S. PATENT DOCUMENTS

| | | | | |
|---|---|---|---|---|
| 9,020,359 B2* | 4/2015 | Yoo | H04B 10/116 | |
| | | | 398/172 | |
| 9,054,799 B2* | 6/2015 | Park | H04B 10/116 | |
| 9,432,117 B2* | 8/2016 | Chen | H04B 10/116 | |
| 9,615,302 B2* | 4/2017 | Zhi | H04W 36/30 | |
| 10,461,860 B2* | 10/2019 | Miras | H04B 10/1143 | |
| 10,623,098 B2* | 4/2020 | Li | H04W 88/08 | |
| 10,998,971 B2* | 5/2021 | Seyvet | H04B 10/1149 | |
| 2002/0071161 A1* | 6/2002 | Perkins | H04B 10/114 | |
| | | | 398/118 | |
| 2008/0292320 A1 | 11/2008 | Pederson | | |
| 2009/0310971 A1* | 12/2009 | Kim | H04W 28/16 | |
| | | | 398/103 | |
| 2010/0129087 A1* | 5/2010 | Kim | H04B 10/1149 | |
| | | | 398/182 | |
| 2011/0069951 A1* | 3/2011 | Son | H04B 10/1149 | |
| | | | 398/17 | |
| 2011/0069957 A1* | 3/2011 | Kim | H04B 10/1149 | |
| | | | 398/79 | |
| 2011/0069971 A1* | 3/2011 | Kim | H04B 10/1149 | |
| | | | 398/172 | |
| 2011/0105134 A1* | 5/2011 | Kim | H04W 72/51 | |
| | | | 455/450 | |
| 2011/0170872 A1* | 7/2011 | Shin | H04J 13/00 | |
| | | | 398/103 | |
| 2011/0217044 A1* | 9/2011 | Kang | H04B 10/116 | |
| | | | 398/67 | |
| 2012/0008959 A1* | 1/2012 | Son | H04B 10/116 | |
| | | | 398/99 | |
| 2012/0093517 A1* | 4/2012 | Rajagopal | H04B 10/116 | |
| | | | 398/130 | |
| 2013/0136456 A1* | 5/2013 | Yoo | H04B 10/116 | |
| | | | 398/118 | |
| 2013/0136457 A1* | 5/2013 | Park | H04B 10/116 | |
| | | | 398/118 | |
| 2014/0085642 A1* | 3/2014 | Kim | G01S 5/14 | |
| | | | 356/614 | |
| 2014/0140703 A1* | 5/2014 | Sako | H04B 10/114 | |
| | | | 398/115 | |
| 2014/0153923 A1* | 6/2014 | Casaccia | H04B 10/1149 | |
| | | | 398/58 | |
| 2014/0255038 A1 | 9/2014 | Richards, IV | | |
| 2014/0270798 A1* | 9/2014 | Manahan | H04B 10/1149 | |
| | | | 398/130 | |
| 2014/0328599 A1* | 11/2014 | Pederson | H04B 10/524 | |
| | | | 398/118 | |
| 2015/0016825 A1* | 1/2015 | Haruyama | H04B 10/116 | |
| | | | 398/118 | |
| 2015/0318922 A1* | 11/2015 | Poola | H05B 45/10 | |
| | | | 398/45 | |
| 2015/0373610 A1 | 12/2015 | Zhi et al. | | |
| 2016/0191156 A1* | 6/2016 | Chen | H04B 10/116 | |
| | | | 398/118 | |
| 2016/0352424 A1* | 12/2016 | Kido | H04B 10/116 | |
| 2017/0207851 A1* | 7/2017 | Zeng | H04B 10/116 | |
| 2017/0286889 A1* | 10/2017 | Yu | G06Q 10/063114 | |
| 2017/0351946 A1* | 12/2017 | Jayawardena | G06Q 10/087 | |
| 2019/0020414 A1* | 1/2019 | Jiang | H04W 74/04 | |
| 2019/0261239 A1* | 8/2019 | Wang | H04B 10/116 | |
| 2019/0305846 A1* | 10/2019 | Kido | H04B 10/808 | |
| 2020/0008283 A1* | 1/2020 | Ahmad | H04B 10/116 | |

OTHER PUBLICATIONS

International Search Report and Written Opinion of the International Searching Authority for International Application No. PCT/EP2016/065261 dated Feb. 21, 2017.

Tatsuya Ito et al., "Improving Wireless LAN Throughput by Using Concurrent Transmissions From Multiple Access Points Based on Location of Mobile Hosts," 2015 IEEE International Conference on Pervasive Computing and Communication Workshops, Mar. 23, 2015, pp. 99-104.

* cited by examiner

CONTROLLING COMMUNICATIONS BETWEEN VISIBLE LIGHT COMMUNICATION ACCESS POINTS AND USER EQUIPMENTS

CROSS REFERENCE TO RELATED APPLICATIONS

This application is a continuation of U.S. patent application Ser. No. 16/313,085 titled "Controlling Communications Between Visible Light Communication Access Points and User Equipments" filed on Dec. 24, 2018, which is a 35 U.S.C. § 371 national stage application of PCT International Application No. PCT/EP2016/065261, filed on Jun. 30, 2016, the disclosure and content of which are incorporated by reference herein in their entireties.

TECHNICAL FIELD

The present disclosure relates generally to networking systems and methods and more particularly to Visible Light Communication (VLC) systems and related Access Points (AP).

BACKGROUND

With the explosion of smart phones, tablets, laptops, and other user equipment (UE) both in enterprise (e.g., bring your own device or BYOD) and guest account scenarios, there is an ever increasing demand for wireless bandwidth in high density UE environments. Conventionally, WLAN (also referred to as Wireless Fidelity (WiFi)) is a primary means of connectivity for UEs. WLAN is generally defined in IEEE 802.11 and variants thereof. The wireless spectrum which is necessary for communication between WiFi/WLAN Access Points (APs) and UEs is becoming increasingly scarce as demand grows exponentially with the proliferation of such devices.

Deploying more WiFi/WLAN Access Points (APs) may not be a right solution because of already high levels of interference from competing devices. Many UEs support communication modes beyond WiFi, including utilizing subscriber services provided by wireless service operators with 3G, 4G Long Term Evolution (LTE), and other communication protocols. Disadvantageously, connectivity through subscriber services can be more costly and/or may provide lower bandwidth than WiFi. Accordingly, there is a need for alternative systems and methods to providing wireless bandwidth in high density UE environments.

Visible Light Communication (VLC) systems use the visible light portion of the electromagnetic spectrum for communication between APs and UEs. VLC may also be referred to as LiFi (Light WiFi). VLC is an alternative to a radio frequency based communications approach but can also be prone to interference in some environments.

SUMMARY

Some embodiments disclosed herein are directed to a method by a coordination node for controlling communications between Visible Light Communication, VLC, Access Points, APs, and user equipments, UEs. The method includes identifying occurrence of an event relating to operation of a first VLC AP. The method further includes, responsive to identifying the occurrence of the event, determining that a second VLC AP and a third VLC AP each have communication coverage areas that are at least partially within a communication coverage area of the first VLC AP. The method further includes, responsive to identifying the occurrence of the event, controlling the second VLC AP to avoid it interfering with communications between the first VLC AP and a UE while it is within a common communication coverage area of the first VLC AP and the second VLC AP. The method further includes, responsive to identifying the occurrence of the event, controlling the third VLC AP to avoid it interfering with communications between the first VLC AP and the UE while it is within a common communication coverage area of the first VLC AP and the second VLC AP.

A potential advantage of this approach is that it can provide more efficient and robust management of VLC APs that have common communication coverage areas. When a VLC AP having a larger coverage area that overlaps smaller areas of two other VLC APs, occurrence of a defined event can trigger the VLC APs to be controlled so that the larger area VLC AP takes over for the smaller area VLC APs for handling communications with the UEs. Potential interference is thereby avoided and mobility of those UEs is enhanced. Moreover, replacing operation of the smaller coverage area VLC APs with the larger area single VLC AP can provide power savings during the continuing communications with the UEs. Various events that can trigger the transfer of control can include power-on of the larger area VLC AP, power-off of one or both of the smaller area VLC APs, loss of ability of one or both of the smaller area VLC APs to communicate with UEs, etc. Passing communication responsibility from the larger area VLC AP to the smaller area VLC APs can also occur responsive to defined events.

Some other related embodiments are directed to a coordination node for controlling communications between Visible Light Communication, VLC, Access Points, APs, and user equipments, UEs. The coordination node can include a network interface; a processor coupled to the network interface; and a memory coupled to the processor and storing program code that when executed by the processor causes the processor to perform operations. The operations include identifying occurrence of an event relating to operation of a first VLC AP. The operations further include, responsive to identifying the occurrence of the event, determining that a second VLC AP has a communication coverage area that is at least partially within a communication coverage area of the first VLC AP. The operations further include, responsive to determining that the second VLC AP has a communication coverage area that is at least partially within a communication coverage area of the first VLC AP, controlling the second VLC AP, separate from handling over a UE between the first VLC AP and the second VLC AP, to avoid the second VLC AP from interfering with communications between the first VLC AP and any UEs within a common communication coverage area of the second VLC AP and the first VLC AP.

Other methods, coordination nodes, computer program products, and systems according to embodiments will be or become apparent to one with skill in the art upon review of the following drawings and detailed description. It is intended that all such additional methods, coordination nodes, computer program products, and systems be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Embodiments of the present disclosure are directed to improving how communications between VLC APs and UEs are controlled when the VLC APs have at least partially overlapping communication coverage areas. Although the light sources used for VLC APs can have light beams configured to provide more well defined communication coverage areas than RF based APs, VLC APs can have overlapping communication coverage areas that can be a source of interference to each other. Moreover, solid or opaque objects within the communication coverage areas can interfere with VLC coverage and generate interference in ways that don't occur with RF based communications. VLC APs are also anticipated to be used predominately indoors where their density and associated communication coverage areas can overlap in complex ways and where mobility of UEs, such as while a user is walking down a hallway, can complicate the ability of such systems to maintain reliable communication links.

Figure 1:
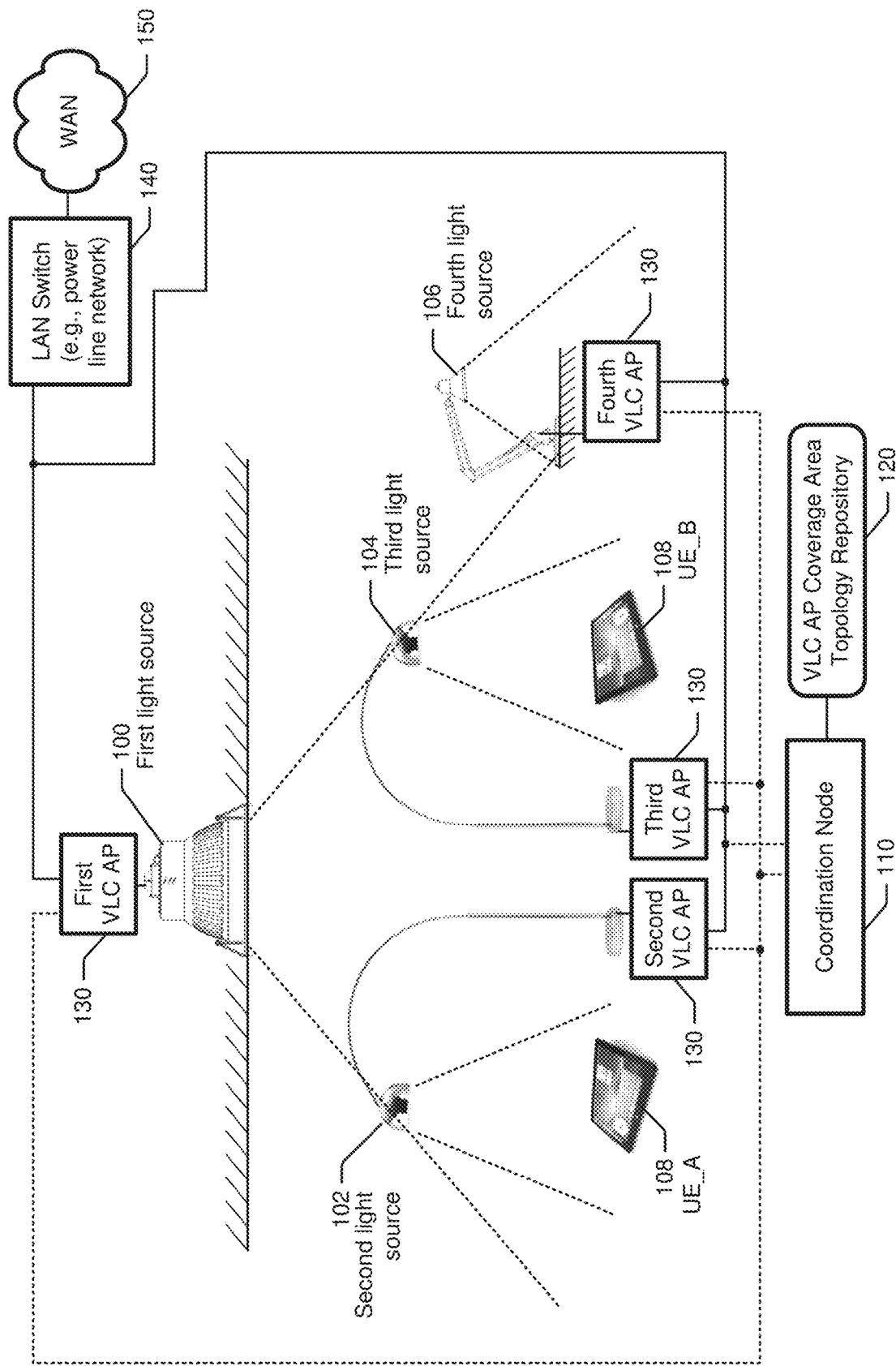
FIG. 1 is a block diagram of a system that includes a coordination node that controls communications between VLC APs and UEs in accordance with some embodiments of the present disclosure.

FIG. 1 is a block diagram of a system that includes a coordination node 110 that controls communications between VLC APs 130 and UEs 108 in accordance with some embodiments of the present disclosure. The VLC APs 130 are connected to a wide area network (WAN) 150 through a local area network (LAN) switch 140 via, e.g., a power line network through their power line connections, WiFi, or other wired/wireless connection. The VLC APs 130 each have a communication coverage area in which they use the visible light portion of the electromagnetic spectrum for communicating data from/to UEs 108 and the LAN switch 140.

In the non-limiting example of FIG. 1, a first VLC AP 130 controls (modulates) a first light source 100, e.g., ceiling mounted light, to transmit data toward UEs 108 and receive data from the UEs 108 within a communication coverage area of the first light source 100 and an associated light receiver. A second VLC AP 130 communicates with UE_A 108 through a smaller communication coverage area provided by a second light source 102, e.g., floor lamp, and an associated light receiver. Similarly, a third VLC AP 130 communicates with UE_B 108 through a smaller communication coverage area provided by a third light source 104, e.g., floor lamp, and a receiver. A fourth VLC AP 130 communicates with any UEs in the communication coverage area of a fourth light source 106, e.g., a table lamp, and associated light receiver.

The communication coverage area of the first VLC AP 130 is illustrated in FIG. 1 as overlapping the communication coverage areas of the second and third VLC APs 130. The fourth VLC AP 130 is illustrated as having a non-overlapping coverage area with the second and third VLC APs 130. The first VLC AP 130 may provide communication coverage underneath the table on which the fourth light source rests.

Potential problems that can arise with the illustrated system include that the overlapping communication overage areas of at least the first, second, and third VLC APs 130 can interfere with each other's communications with UEs 108. In accordance with some embodiments, the coordination node 110 controls communications by the VLC APs 130 responsive to identifying occurrence of one or more defined events relating to operation of one or more of the VLC APs 130. Although various embodiments are described in the context of events relating to the VLC APs 130, it is to be understood that this description means also events that can be associated with the light sources and/or light receivers controlled by the VLC APs 130, such when as a light source becomes powered-on, powered-off, inoperative to emit light, inoperative to receive light, etc.

Figure 2:
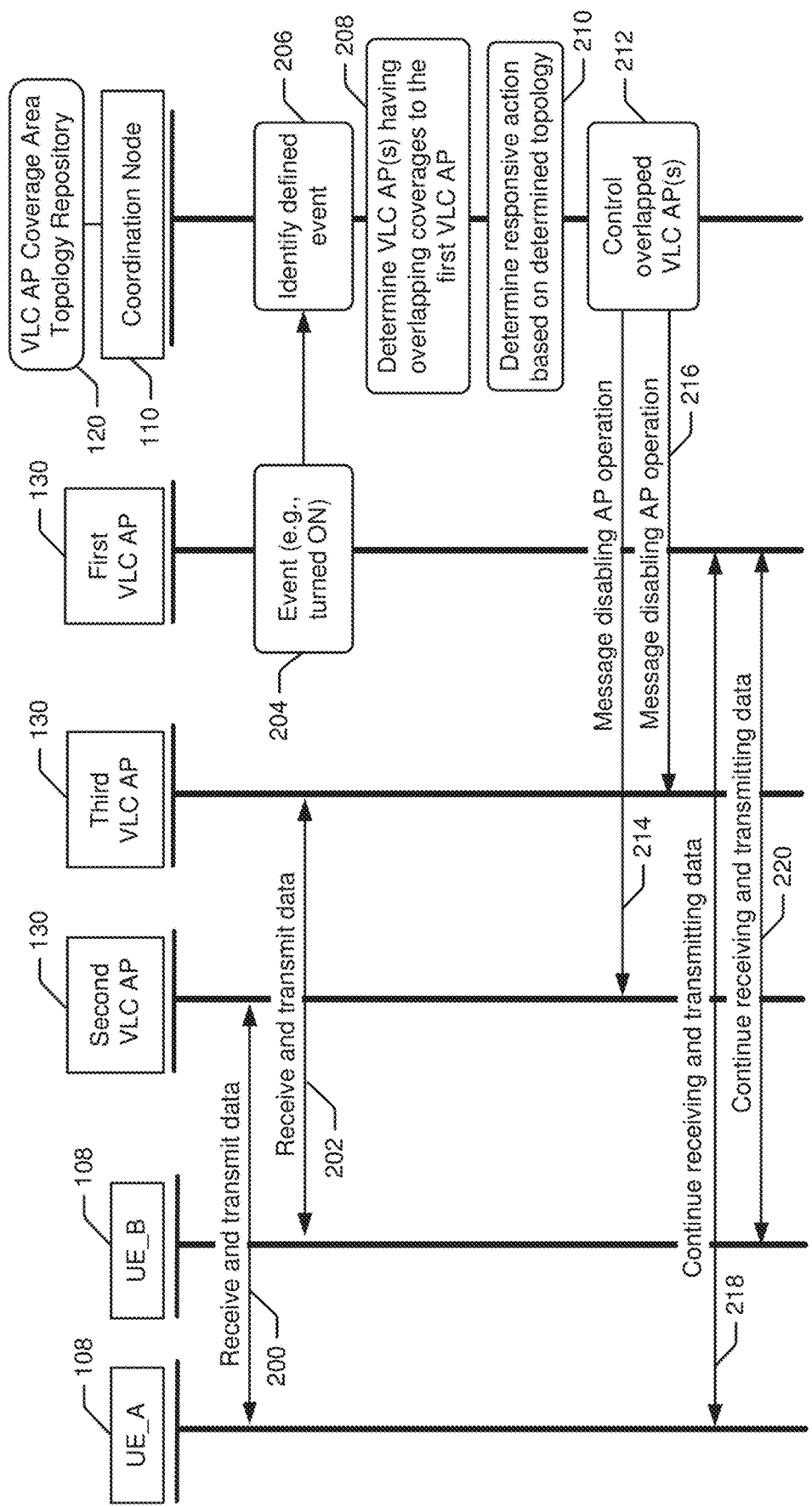
FIG. 2 is a combined data flow diagram and flowchart of operations by a coordination node, VLC APs and UEs in accordance with some embodiments of the present disclosure.

FIG. 2 is a combined data flow diagram and flowchart of operations by the coordination node 110, the VLC APs 130, and the UEs 108 in accordance with some embodiments of the present disclosure.

Referring to FIGS. 1 and 2, UE_A communicates 200 with the second VLC AP 130 controlling the second light source 102 to receive and transmit data, and UE_B communicates 202 with the third VLC AP 130 controlling the third light source 104 to receive and transmit data. A defined event subsequently occurs (block 204) affecting operation of the first VLC AP 130. The defined event may correspond to the first VLC AP 130 being turned ON or the first light source 100 being turned ON. Thus, in one embodiment an event associated with operation of the first VLC AP 130 can be an event that directly affects operability of the first VLC AP 130 or an event that affects operability of the first light source 100 controlled by the first VLC AP 130 and which, thereby, indirectly affects operability of the first VLC AP 130. Because the first, second, and third light sources 100-104 have at least partially overlapping communication coverage areas, the first light source 100 could interfere with the communications 200 and 202 with UE_A and UE_B, respectively, and any other UEs in those coverage areas.

In one embodiment, the coordination node 110 identifies (block 206) occurrence of the event relating to operation of the first VLC AP 130. Responsive to identification of occurrence of the event, the coordination node 110 determines (block 208) that the second VLC AP 130 and the third VLC AP 130 each have communication coverage areas that are at least partially within the communication coverage area of the first VLC AP 130. The coordination node 110 determines (block 210) a responsive action to be performed based on the determined topology. The responsive action triggers the coordination node 110 to control (block 212) the second and the third VLC APs 130 responsively to avoid their interfering with communications between the first VLC AP 130 and any UEs 108 within common communication coverage areas of the second or the third VLC APs 130. The control (block 212) may include transmitting a message (214) to the second VLC AP 130 to disable its AP operation (e.g., turn-off the second light source 102 or disable its VLC modulation of light emitted therefrom), and similarly transmitting a message (216) to the third VLC AP 130 to disable its AP operation (e.g., turn-off the third light source 104 or disable its VLC modulation of light emitted therefrom). The coordination node 110 may communicate a single message instead of separate messages 214 and 216 toward the second and third VLC APs 130, respectively. When the event that is identified (block 206) affects operability of the first light source 100 (e.g., turned ON), the coordination node 110 can send a message to the first VLC AP 130 commanding it to turn ON or otherwise become operable to perform VLC through the first light source 100.

UE_A and UE_B may then continue to receive and transmit data 218 and 220 through the first VLC AP 130. The operations may be performed so that communications between the UEs 108 and the LAN switch 140 are not interrupted by the disabling of AP operation of the second and third VLC APs 130.

A potential advantage of this approach is that it can provide more efficient and robust management of the VLC APs. Potential interference between the first VLC AP 130 and the pair of second and third VLC APs 130 is avoided and mobility of the UEs 108 is enhanced. Moreover, replacing operation of the second and third VLC APs 130 with the larger area first VLC AP 130 can provide power savings for the continuing communications with the UEs 108.

To determine (block 208) which VLC APs 130 have overlapping communication coverage areas, the coordination node 110 may access a VLC AP coverage area topology repository 120 that contains topology information identifying which VLC APs 130 have at least partially overlapping communication coverage areas.

In one embodiment the topology information is defined by an operator when the light sources 100, 102, 104, and 106 are installed or placed within a room, by observing and recording which of the light sources 100 have overlapping illuminated areas. In another embodiment the topology information is determined by the coordination node 110 based on reports received from the VLC APs 130 which indicate which VLC APs 130 have detected in their respective coverage areas signals transmitting by other adjacent VLC APs 130.

In yet another embodiment the topology information is determined by the coordination node 110 based on coverage reports that are transmitted by the UEs 108 through their servicing VLC APs 130 which indicate from which VLC APs 130 the respective UEs 108 have received signals. Thus, for example, when a UE coverage report from UE_A 108 indicates that it has received signals from the first VLC AP 130 and from the second VLC AP 130, the coordination node 110 determines that the first and second VLC APs 130 have at least partially overlapping coverage areas and responsively updates topology information in the VLC AP coverage area topology repository 120. The coordination node 110 can similarly update the topology information in the VLC AP coverage area topology repository 120 to indicate that the first and third VLC APs 130 have at least partially overlapping coverage areas responsive to a UE coverage report from UE_B 108 indicating that it has received signals from the first VLC AP 130 and from the third VLC AP 130. In this manner the coordination node 110 can learn over time and update the VLC AP coverage area topology repository 120 to indicate which VLC APs have at least partially overlapping communication coverage areas.

Further embodiments are now explained in the context of FIGS. 3-11, which are flowcharts of operations and methods by the coordination node 110 to control communications between the VLC APs 130 and UEs 108.

Figure 3:
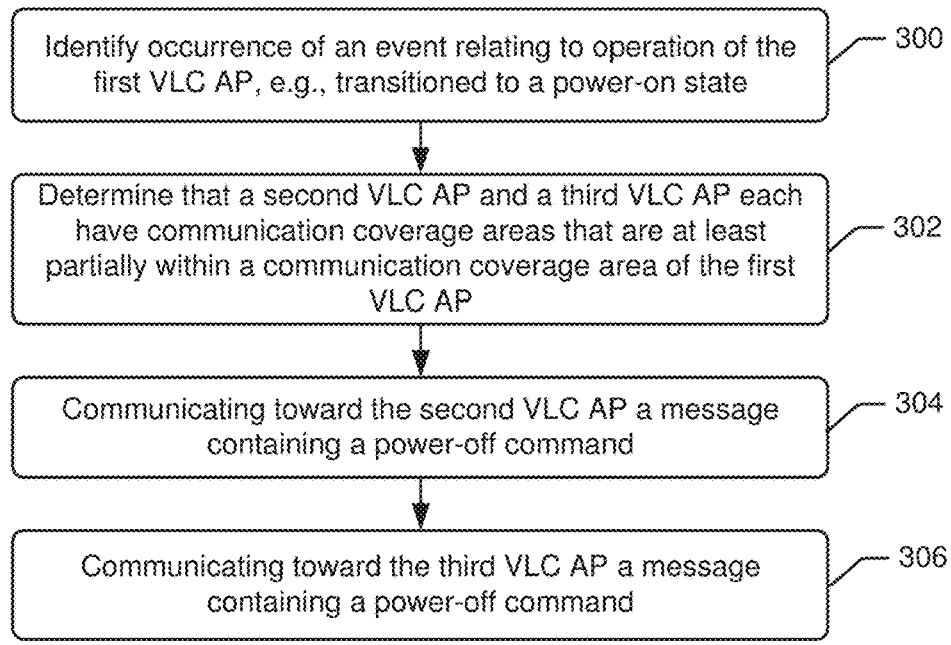
FIGS. 3-11 are flowcharts of operations and methods by a coordination node to control communications between VLC APs and UEs in accordance with some embodiments of the present disclosure.

In some embodiments, the coordination node 110 disables operation of the second and third VLC APs 130 responsive to identifying that the first VLC AP 130 has become powered-on. Referring to FIG. 3, the coordination node 110 identifies (block 300) that the first VLC AP 130 has transitioned to a power-on state, such as due to a user operating a wall mounted power-switch, or occurrence of another defined event relating to operation of the first VLC AP 130. A determination (block 302) is made that the second VLC AP 130 and the third VLC AP 130 each have communication coverage areas that are at least partially within the communication coverage area of the first VLC AP 130, responsive to identification of occurrence of the event. The coordination node 110 communicates (block 304) toward the second VLC AP 130 a message containing a power-off command, and communicates (block 306) toward the third VLC AP 130 a message containing a power-off command. The coordination node 110 may communicate a single message instead of separate messages toward the second and third VLC APs 130.

Figure 4:
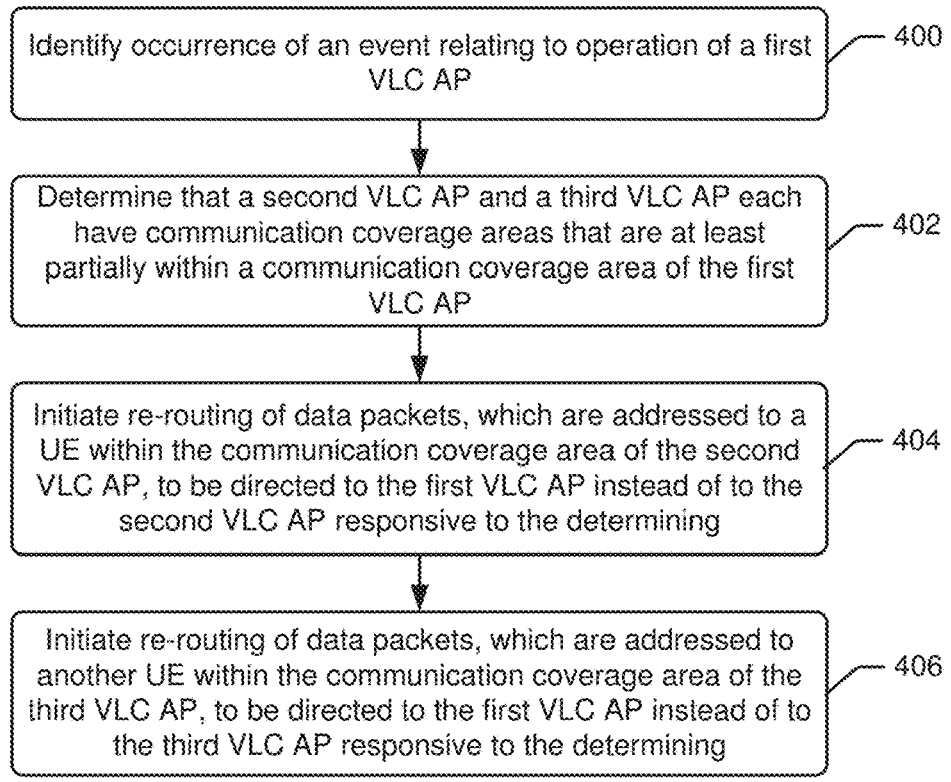

The coordination node 110 may additionally or alternatively initiate re-routing of data packets responsive to identifying occurrence of an event relating to operation of the first VLC AP 130, such as an event indicating that the first VLC AP 130 has transitioned to a state that now allows it to perform VLC with UEs. Referring to FIG. 4, the coordination node 110 identifies (block 400) occurrence of an event relating to operation of the first VLC AP 130, and responsively determines (block 402) that the second VLC AP 130 and the third VLC AP 130 each have communication coverage areas that are at least partially within a communication coverage area of the first VLC AP 130. The identified event may correspond to the first VLC AP 130 becoming powered-on or otherwise becoming able to communicate with UEs 108. The coordination node 110 responsively initiates (block 404) re-routing of data packets, which are addressed to a UE within the communication coverage area of the second VLC AP 130, to be directed to the first VLC AP 130 instead of to the second VLC AP 130, and initiates (block 406) re-routing of data packets, which are addressed to the UE_B 108 within the communication coverage area of the third VLC AP 130, to be directed to the first VLC AP 130 instead of to the third VLC AP 130. The coordination node 110 may furthermore control the second and third VLC APs 130 to turn off the second and third light sources 102 and 104, respectively, or otherwise disable their modulation of light emitted therefrom so as to avoid interfering with VLC between the first VLC AP 130 and UEs 108.

Figure 5:
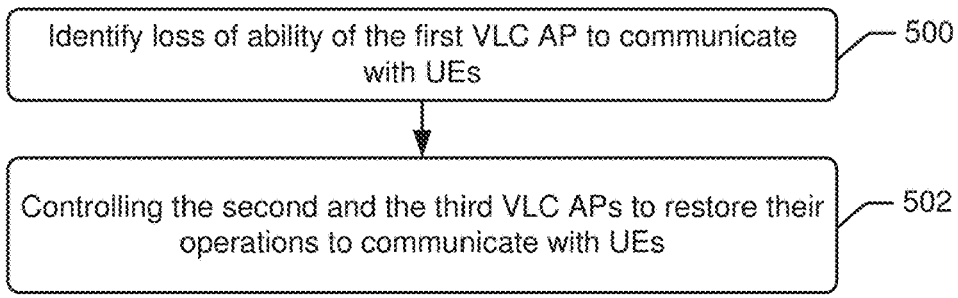

The coordination node 110 may subsequently control the second and third VLC APs 130 to restore their communications with UEs responsive to detecting occurrence of an event associated with loss of the ability of the first VLC AP 130 to communicate with the UEs, e.g., power-off or operational failure of the first VLC AP 130 and/or the first light source 100. Referring to FIG. 5, the coordination of 110 identifies (block 500) loss of ability of the first VLC AP 130 to communicate with UEs 108 and, responsively controls (block 502) the second and the third VLC APs 130 to restore their operations to communicate with UEs 108, e.g., UE_A and UE_B.

Figure 6:
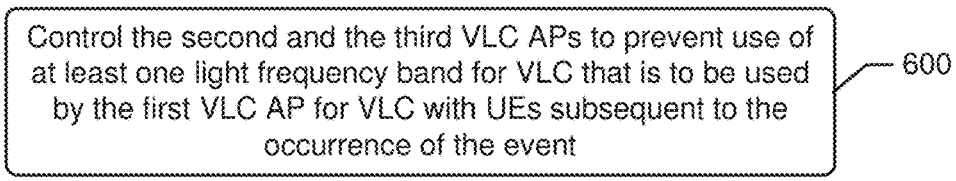

In another embodiment, the coordination node 110 operates to control one or more frequency bands that are used for VLC by the first VLC AP 130 and/or by the second and third VLC APs 130 responsive to detecting an event indicating that interference between the VLC APs 130 could occur. Referring to FIG. 6, the coordination node 110 controls (block 600) the second and the third VLC APs 130 to prevent use of at least one light frequency band by the first VLC AP 130 for VLC with UEs 108 subsequent to the occurrence of the event.

Although various embodiments have been explained in which the coordination node 110 directly controls operation of the second and third VLC APs 130, in some other embodiments the coordination node 110 operates to coordinate negotiations between the VLC APs 130 to avoid their interfering with each other. Accordingly, decentralized decision-making can be performed instead of via centralized decisions by the coordination node 110. In one embodiment, responsive to the determination (e.g., block 208 of FIG. 2 or block 302 of FIG. 3), the coordination node 110 operates to coordinate negotiations between the VLC APs 130, e.g., first, second, and third VLC APs, for which of the VLC APs 130 will operate to communicate with any UEs in their respective coverage areas to avoid their interfering with VLC by other operating VLC APs. Thus, for example, the coordination node 110 can operate to identify the overlapping communication coverage areas and initiate negotiations to occur between the first VLC AP and the second and third VLC APs. The negotiations may be performed using negotiation messaging that is routed through the coordination node 110 and/or directly between the VLC APs 130.

Some other embodiments are directed to operations and methods for determining the topology of the communication coverage areas provided by the plurality of VLC APs 130 and, particularly, recording in the repository 120 which two or more of the VLC APs 130 have at least partially overlapping communication coverage areas. In one embodiment, the coordination node 110 determines (block 208, FIG. 2) that the second VLC AP 130 and the third VLC AP 130 each have communication coverage areas that are at least partially within a communication coverage area of the first VLC AP 130, based on accessing the coverage area topology repository 120 using an identifier for the first VLC AP 130 to obtain an identifier for the second VLC AP 130 and an identifier for the third VLC AP 130. As explained above, the coverage area topology repository 120 maps identifiers for minor VLC APs 130 to identifiers for major VLC APs 130, e.g., the first VLC AP, that at least partially overlap smaller communication coverage areas of the mapped ones of the minor VLC APs 130, e.g., the second and third VLC APs 130.

Figure 7:
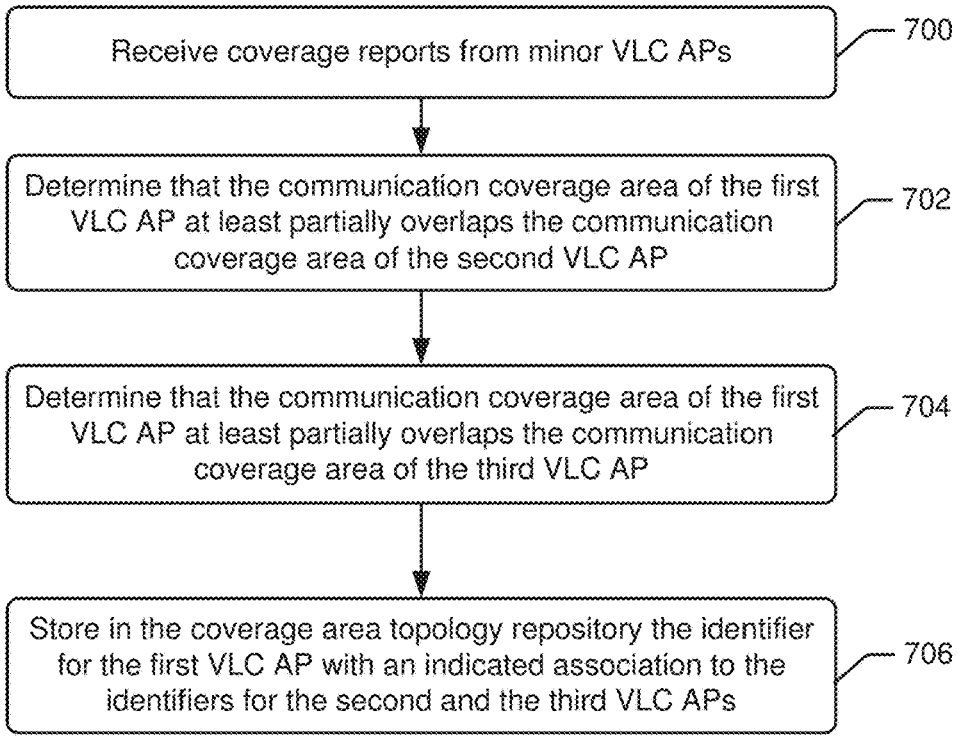

FIG. 7 illustrates example operations and methods that may be performed by the coordination node 110 to add, remove, or modify topology information in the VLC AP coverage area topology repository 120. Referring to FIG. 7, the coordination node 110 receives (block 700) coverage reports from the minor VLC APs 130, e.g., second, third, and fourth VLC APs. Each of the coverage reports contains an identifier for one of the minor VLC APs 130 that sent the coverage report and contains an identifier for one of the major VLC APs 130, e.g., first VLC AP, that was received by the one of the minor VLC APs 130 in a data packet transmitted using VLC by the one of the major VLC APs 130.

The coordination node 110 may furthermore respond thereto by determining (block 702) that the communication coverage area of the first VLC AP 130 at least partially overlaps the communication coverage area of the second VLC AP 130 based on the coverage report received from the second VLC AP 130 containing the identifier of the first VLC AP 130 and the identifier of the second VLC AP 130, and then store (block 706) in the coverage area topology repository 120 the identifier for the first VLC AP 130 with an indicated association to the identifier for the second VLC AP 130. Similarly, the coordination node 110 can determine (block 704) that the communication coverage area of the first VLC AP 130 at least partially overlaps the communication coverage area of the third VLC AP 130 based on the coverage report received from the third VLC AP 130 containing the identifier of the first VLC AP 130 and the identifier of the third VLC AP 130, and then store (block 706) in the coverage area topology repository 120 information associating the identifier for the first VLC AP 130 to the identifier for the third VLC AP 130.

Some other embodiments of the disclosure are directed to various events that can trigger the coordination node 110 to control communications by one or more of the VLC APs 130.

Figure 8:
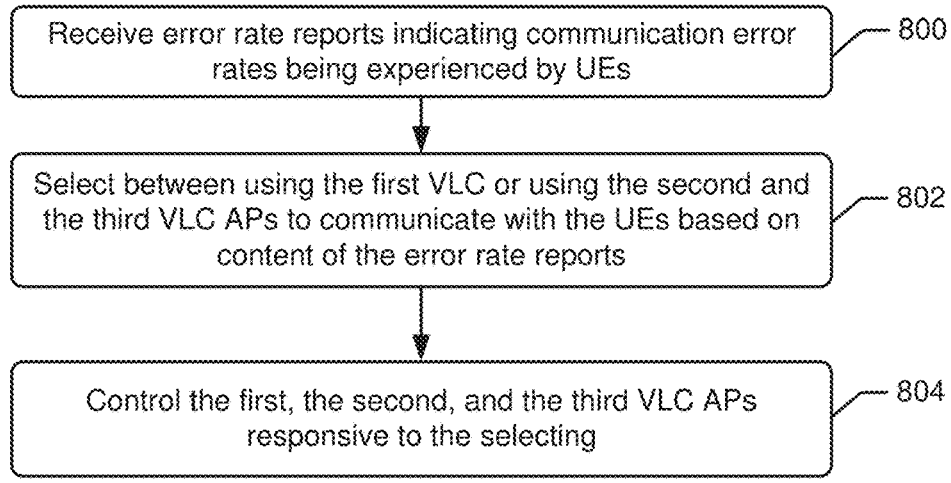

In the embodiment of FIG. 8, error rates being experienced by the UEs 108 can cause the coordination node 110 to control one or more of the VLC APs 130. More particularly, the coordination node 110 receives (block 800) error rate reports indicating communication error rates being experienced by UEs 108, and selects (block 802) between using the first VLC AP 130 or using the second and the third VLC APs 130 to communicate with the UEs 108 based on content of the error rate reports. The coordination node 110 controls (block 804) the first, the second, and third VLC APs 130 responsive to the selection (block 802). Thus, for example, when an excessive error rate occurs in communications between the second VLC AP 130 and UE_A 108, the first VLC AP 130 can be activated to takeover communication responsibility from the second and third VLC APs 130.

Figure 9:
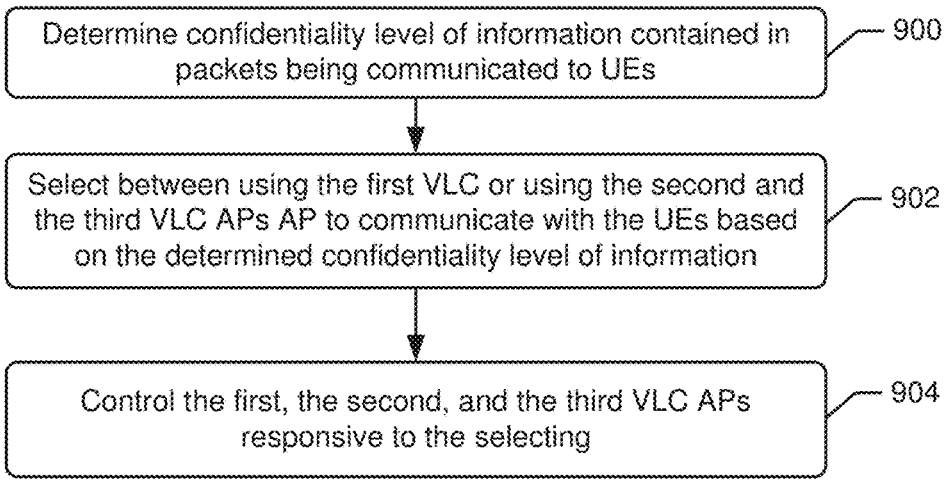

In the embodiment of FIG. 9, the confidentiality level of information contained in packets communicated to UEs can cause the coordination node 110 to control one or more of the VLC APs 130. More particularly, the coordination node 110 determines (block 900) a confidentiality level of information contained in packets being communicated to UEs 108, and selects (block 102) between using the first VLC AP 130 or using the second and the third VLC APs 130 to communicate with the UEs 108 based on the determined confidentiality level of information. The coordination node 110 controls (block 904) the first, the second, and the third VLC APs 130 responsive to the selection (block 902). For example, less confidential information can be communicated through the first VLC AP 130 to UE_A while highly confidential information (e.g., information having at least a threshold level of secrecy) can be communication through the second VLC AP 130 to UE_A. Using a smaller communication coverage area to transmit or receive highly confidential information can reduce the likelihood of it being overheard by other UEs, relative to if the larger coverage area of the first VLC AP 130 were instead used.

Figure 10:
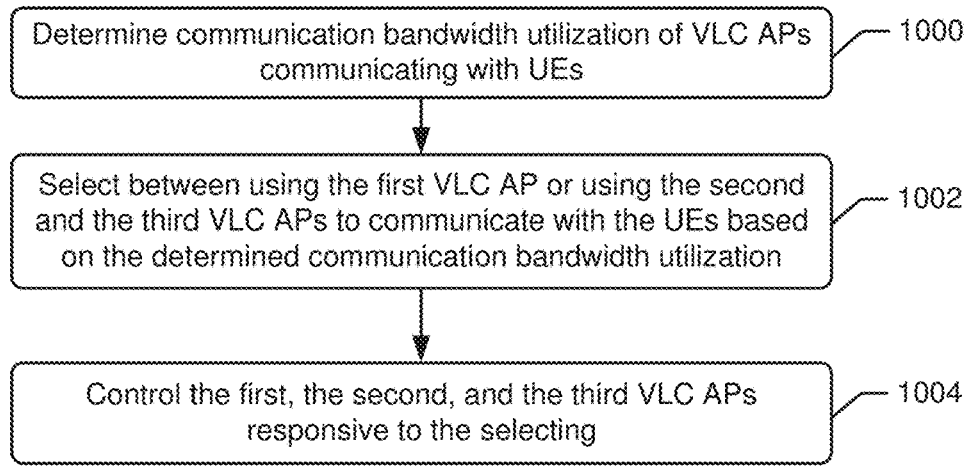

In the embodiment of FIG. 10, communication bandwidth utilization of the PLC APs 130 can cause the coordination node 110 to control one or more of the VLC APs 130. More particularly, the coordination node 110 determines (block 1000) communication bandwidth utilization of the VLC APs 130 communicating with UEs 108, and selects (block 1002) between using the first VLC AP 130 or using the second and the third VLC APs 130 to communicate with the UEs 108 based on the determined communication bandwidth utilization. The coordination node 110 controls (block 1004) the first, the second, and the third VLC APs 130 responsive to the selection (block 1002). For example, when the first VLC AP 130 becomes overloaded by having an excessively high communication bandwidth utilization, the coordination node 110 can trigger the second and third VLC APs 130 to takeover communication responsibility from the first VLC AP 130. The smaller communication coverage areas of the second and third VLC APs 130 can provider higher bandwidth communications in high density UE environments compared to the larger communication coverage area of the first VLC AP 130.

Figure 11:
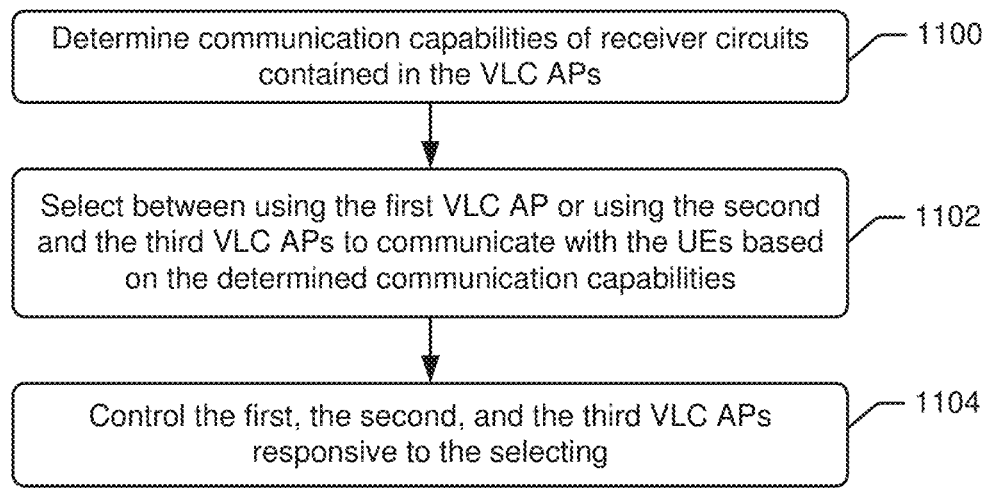

In the embodiment of FIG. 11, the identifier communication capabilities of receiver circuits contained in the VLC APs 130 can cause the coordination node 110 to control one or more of the VLC APs 130. More particularly, the coordination node 110 determines (block 1100) communication capabilities of receiver circuits contained in the VLC APs 108, and selects (block 1102) between using the first VLC AP 130 or using the second and the third VLC APs 130 to communicate with the UEs 108 based on the determined communication capabilities. The coordination node 110 controls (block 1104) the first, the second, and the third VLC APs 130 responsive to the selection (block 1102). For example, the modulation and/or coding capability of the receiver circuits can be used to select between the VLC APs 130 to provide an improved operational match to the transmitter circuits of UEs that are to be provided service.

Figure 12:
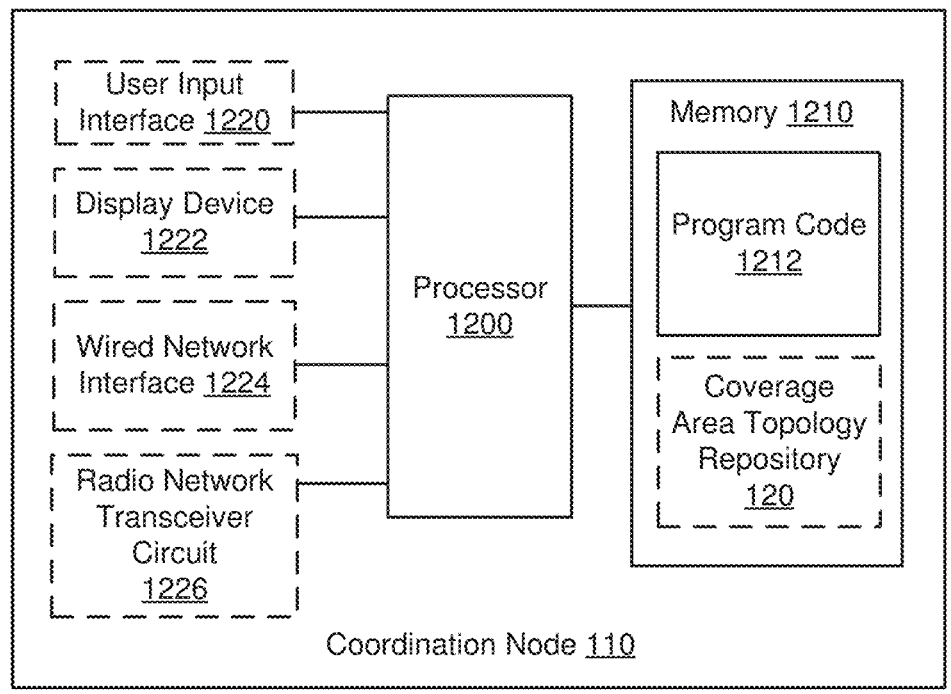
FIG. 12 is a block diagram of a coordination node that is configured according to some embodiments of the present disclosure.

FIG. 12 is a block diagram of the coordination node 110 that is configured according to some embodiments of the present disclosure. The coordination node 110 includes a processor 1200, a memory 1210, and a network interface circuit which may include a radio and/or VLC network transceiver circuit 1226 and/or a wired network interface 1224 (e.g., Ethernet interface). The radio and/or VLC network transceiver circuit 1226 can include, but is not limited to, a LiFi, a LTE or other cellular transceiver, WIFI transceiver (IEEE 802.11), Bluetooth, WiMax transceiver, or other wireless communication transceiver configured to communicate with the VLC APs 130.

The processor 1200 may include one or more data processing circuits, such as a general purpose and/or special purpose processor (e.g., microprocessor and/or digital signal processor) that may be collocated or distributed across one or more networks. The processor 1200 is configured to execute computer program code 1212 in the memory 1210, described below as a non-transitory computer readable medium, to perform at least some of the operations described herein as being performed by a coordination node. The memory 1210 may further include the coverage area topology repository 120. The coordination node 110 may further include a user input interface 1220 (e.g., touch screen, keyboard, keypad, etc.) and a display device 1222.

Figure 13:
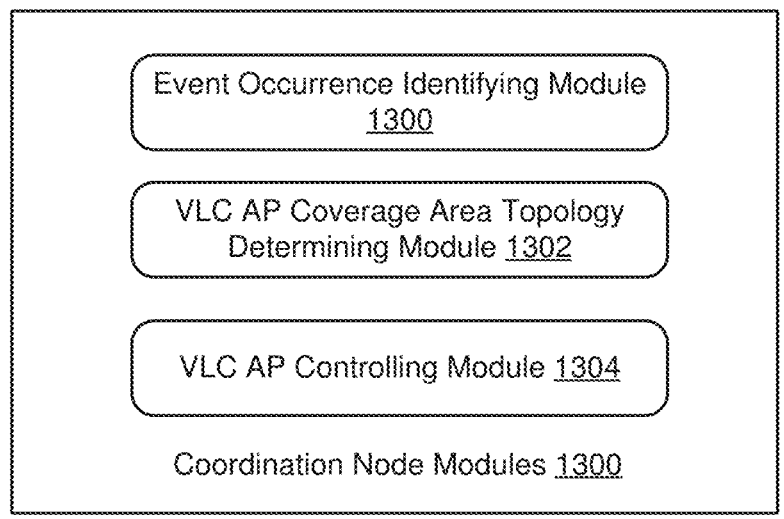
FIG. 13 is a block diagram of modules forming a coordination node that is configured according to some embodiments of the present disclosure.

FIG. 13 is a block diagram of modules 1300 forming a coordination node that is configured according to some embodiments of the present disclosure. Referring to FIG. 13, the modules 1300 include an event occurrence identifying module 1300, a VLC AP coverage area topology determining module 1302, and a VLC AP controlling module 1304. The event occurrence identifying module 1300 is for identifying occurrence of an event relating to operation of a first VLC AP 130. The VLC AP coverage area topology determining module 1302 is for determining that a second VLC AP 130 and a third VLC AP 130 each have communication coverage areas that are at least partially within a communication coverage area of the first VLC AP 130, responsive to identification of occurrence of the event. The VLC AP controlling module 1304 is for controlling the second and the third VLC APs 130 responsive to the determination to avoid their interfering with communications between the first VLC AP 130 and any UEs 108 within common communication coverage areas of the second or the third VLC APs 130.

Figure 14:
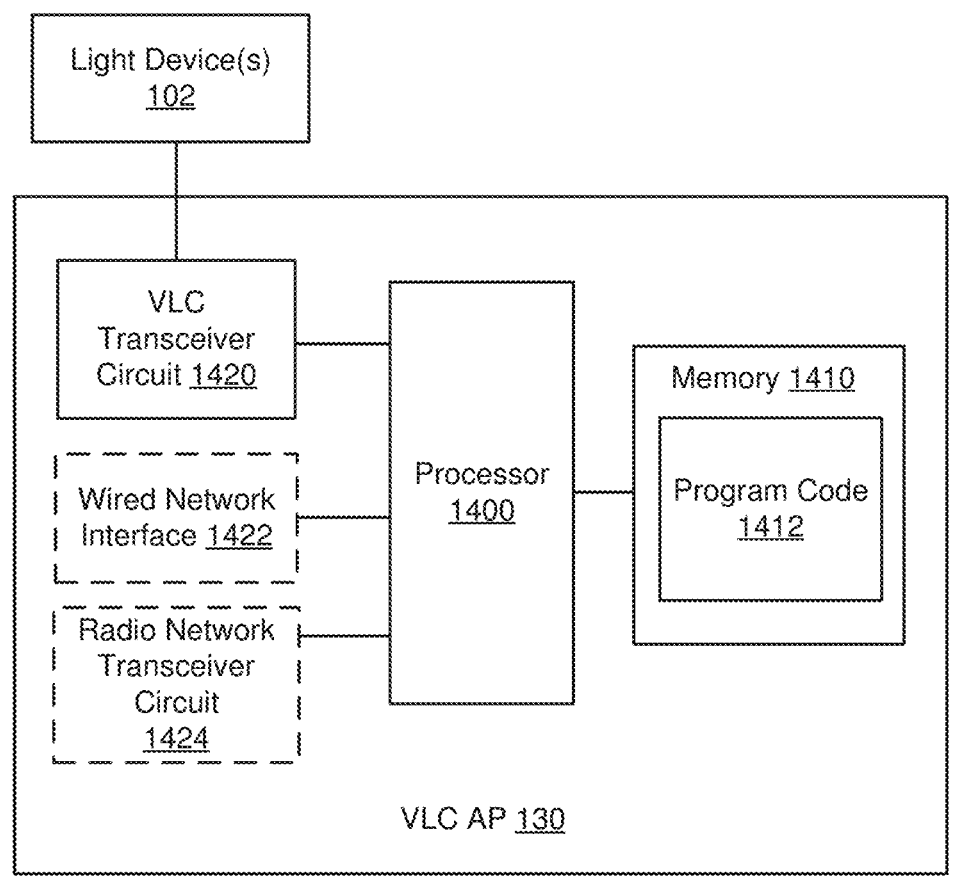
FIG. 14 is a block diagram of a VLC AP that is configured according to some embodiments of the present disclosure.

FIG. 14 is a block diagram of a VLC AP 130 that is configured according to some embodiments of the present disclosure. The VLC AP 130 includes a processor 1400, a memory 1410, a VLC transceiver circuit 1420, and may further include a wired network interface 1422 (e.g., Ethernet) and/or a radio network transceiver circuit 1424. The VLC transceiver circuit 1420 is configured to communicate with UEs 108 according to or more embodiments herein. The radio network transceiver circuit 1424 can include, but is not limited to, a LTE or other cellular transceiver, WIFI transceiver (IEEE 802.11), Bluetooth, WiMax transceiver, or other wireless communication transceiver configured to communicate with the coordination node 110.

The processor 1400 may include one or more data processing circuits, such as a general purpose and/or special purpose processor (e.g., microprocessor and/or digital signal processor) that may be collocated or distributed across one or more networks. The processor 1400 is configured to execute computer program code 1412 in the memory 1210, described below as a non-transitory computer readable medium, to perform at least some of the operations described herein as being performed by a VLC AP.

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a coordination node for controlling communications between Visible Light Communication ("VLC") Access Points ("APs") and user equipments ("UEs"), the method comprising:
   identifying occurrence of an event relating to operation of a first VLC AP;
   responsive to identifying the occurrence of the event, determining that a second VLC AP and a third VLC AP each have communication coverage areas that are at least partially within a communication coverage area of the first VLC AP; and
   responsive to identifying the occurrence of the event, controlling the second VLC AP to avoid it interfering with communications between the first VLC AP and a UE while it is within a common communication coverage area of the first VLC AP and the second VLC AP; and
   responsive to identifying the occurrence of the event, controlling the third VLC AP to avoid it interfering with communications between the first VLC AP and the UE while it is within a common communication coverage area of the first VLC AP and the second VLC AP.

2. The method of claim 1, wherein identifying the occurrence of the event relating to operation of the first VLC AP comprises identifying that the first VLC AP has become operational to communicate with UEs located within at least part of the communication coverage areas of the second VLC AP and the third VLC AP, and
   wherein controlling the second VLC AP and the third VLC AP comprises disabling operation of the second VLC AP and the third VLC AP to communicate with UEs.

3. The method of claim 2, wherein identifying that the first VLC AP has now become operational to communicate with UEs located within the communication coverage areas of the second VLC AP and the third VLC AP comprises identifying that the first VLC AP has transitioned to a power-on state, and wherein disabling operation of the second VLC AP and the third VLC AP to communicate with UEs comprises:
  communicating toward the second VLC AP a message containing a power-off command; and
  communicating toward the third VLC AP a message containing a power-off command.

4. The method of claim 2, wherein disabling operation of the second VLC AP and the third VLC AP to communicate with UEs comprises:
  responsive to determining that the second VLC AP and the third VLC AP each have communication coverage area of the first VLC AP, initiating re-routing of data packets, which are addressed to a UE within the communication coverage area of the second VLC AP, to be directed to the first VLC AP instead of to the second VLC AP; and
  responsive to determining that the second VLC AP and the third VLC AP each have communication coverage area of the first VLC AP, initiating re-routing of data packets, which are addressed to another UE within the communication coverage area of the third VLC AP, to be directed to the first VLC AP instead of to the third VLC AP.

5. The method of claim 2, further comprising:
  identifying loss of ability of the first VLC AP to communicate with UEs; and
  responsive to identifying the loss of ability of the first VLC AP, controlling the second VLC AP and the third VLC AP to restore their operations to communicate with UEs.

6. The method of claim 1, wherein identifying the occurrence of the event relating to operation of the first VLC AP comprises identifying transition of the first VLC AP to a power-on state ready for communications with UEs, and
  wherein controlling the second VLC AP and the third VLC AP comprises controlling the second VLC AP and the third VLC AP to prevent use of at least one light frequency band for VLC that is to be used by the first VLC AP for VLC with UEs subsequent to the occurrence of the event.

7. The method of claim 1, wherein determining that the second VLC AP and the third VLC AP each have communication coverage areas that are at least partially within the communication coverage area of the first VLC AP comprises accessing a coverage area topology repository using an identifier for the first VLC AP to obtain an identifier for the second VLC AP and an identifier for the third VLC AP, and
  wherein the coverage area topology repository maps identifiers for minor VLC APs to identifiers for major VLC APs that at least partially overlap smaller communication coverage areas of the mapped ones of the minor VLC APs.

8. The method of claim 1, further comprising:
  determining a confidentiality level of information contained in packets being communicated to UEs;
  selecting between using the first VLC AP or using the second VLC AP and the third VLC AP to communicate with the UEs based on the determined confidentiality level of information; and
  responsive to selecting between using the first VLC AP or using the second VLC AP and the third VLC AP, controlling the first VLC AP, the second VLC AP, and the third VLC AP.

9. The method of claim 1, further comprising:
  determining communication bandwidth utilization of the VLC APs communicating with UEs;
  selecting between using the first VLC AP or using the second VLC AP and the third VLC AP to communicate with the UEs based on the communication bandwidth utilization; and
  responsive to selecting between using the first VLC AP or using the second VLC AP and the third VLC AP, controlling the first VLC AP, the second VLC AP, and the third VLC AP.

10. The method of claim 1, further comprising:
  determining communication capabilities of receiver circuits included in the VLC APs;
  selecting between using the first VLC AP or using the second VLC AP and the third VLC AP to communicate with the UEs based on the communication capabilities; and
  responsive to selecting between using the first VLC AP or using the second VLC AP and the third VLC AP, controlling the first VLC AP, the second VLC AP, and the third VLC AP.

11. The method of claim 1, wherein identifying the occurrence of the event relating to operation of the first VLC AP comprises identifying the occurrence of the event during communication between the first VLC AP and a UE within the common communication coverage areas of the second VLC AP or the third VLC AP.

12. A coordination node for controlling communications between Visible Light Communication ("VLC") Access Points ("APs") and a plurality of user equipments ("UEs"), the coordination node comprising:
  a network interface;
  a processor coupled to the network interface; and
  a memory coupled to the processor and storing program code that when executed by the processor causes the processor to perform operations comprising:
    identifying occurrence of an event relating to operation of a first VLC AP;
    responsive to identifying the occurrence of the event, determining that a second VLC AP has a communication coverage area that is at least partially within a communication coverage area of the first VLC AP; and
    responsive to determining that the second VLC AP has a communication coverage area that is at least partially within a communication coverage area of the first VLC AP, controlling the second VLC AP to perform an operation to avoid the second VLC AP from interfering with communications between the first VLC AP and any UEs within a common communication coverage area of the second VLC AP and the first VLC AP, the operation comprising:
      controlling the second VLC AP to prevent use of at least one light frequency band by the second VLC AP.

13. The coordination node of claim 12, wherein identifying the occurrence of the event relating to operation of the first VLC AP comprises identifying transition of the first VLC AP to a power-on state ready for communications with UEs.

14. The coordination node of claim 12, wherein determining that the second VLC AP has a communication coverage area that is at least partially within the communication coverage area of the first VLC AP comprises accessing a coverage area topology repository using an identifier for the first VLC AP to obtain an identifier for the second VLC AP, and
  wherein the coverage area topology repository maps identifiers for minor VLC APs to identifiers for major VLC APs that at least partially overlap smaller communication coverage areas of the mapped ones of the minor VLC APs.

15. The coordination node of claim 12, wherein the operations further comprise:
determining at least one of: a confidentiality level of information contained in packets being communicated to UEs, a communication bandwidth utilization of the VLC APs communicating with UEs, and communication capabilities of receiver circuits included in the VLC APs;
selecting between using the first VLC AP or using the second VLC AP to communicate with the UEs based on at least one of: the determined confidentiality level of information, the communication bandwidth utilization of the VLC APs communicating with UEs, and the communication capabilities of receiver circuits included in the VLC APs; and
responsive to selecting between using the first VLC AP or using the second VLC AP, controlling the first VLC AP and the second VLC AP.

16. A non-transitory computer-readable medium having instructions stored therein that are executable by a coordination node to perform operations for controlling communications between Visible Light Communication ("VLC") Access Points ("APs") and user equipments ("UEs"), the operations comprising:
identifying occurrence of an event relating to operation of a first VLC AP;
responsive to identifying the occurrence of the event, determining that a second VLC AP and a third VLC AP each have communication coverage areas that are at least partially within a communication coverage area of the first VLC AP; and
responsive to identifying the occurrence of the event, controlling the second VLC AP to avoid it interfering with communications between the first VLC AP and a UE while it is within a common communication coverage area of the first VLC AP and the second VLC AP; and
responsive to identifying the occurrence of the event, controlling the third VLC AP to avoid it interfering with communications between the first VLC AP and the UE while it is within a common communication coverage area of the first VLC AP and the second VLC AP.

17. The non-transitory computer-readable medium of claim 16, wherein identifying the occurrence of the event relating to operation of the first VLC AP comprises identifying that the first VLC AP has become operational to communicate with UEs located within at least part of the communication coverage areas of the second VLC AP and the third VLC AP, and
wherein controlling the second VLC AP and the third VLC AP comprises disabling operation of the second VLC AP and the third VLC AP to communicate with UEs.

18. The non-transitory computer-readable medium of claim 16, wherein identifying the occurrence of the event relating to operation of the first VLC AP comprises identifying transition of the first VLC AP to a power-on state ready for communications with UEs, and
wherein controlling the second VLC AP and the third VLC AP comprises controlling the second VLC AP and the third VLC AP to prevent use of at least one light frequency band for VLC that is to be used by the first VLC AP for VLC with UEs subsequent to the occurrence of the event.

19. The non-transitory computer-readable medium of claim 16, wherein determining that the second VLC AP and the third VLC AP each have communication coverage areas that are at least partially within the communication coverage area of the first VLC AP comprises accessing a coverage area topology repository using an identifier for the first VLC AP to obtain an identifier for the second VLC AP and an identifier for the third VLC AP, and
wherein the coverage area topology repository maps identifiers for minor VLC APs to identifiers for major VLC APs that at least partially overlap smaller communication coverage areas of the mapped ones of the minor VLC APs.

20. The non-transitory computer-readable medium of claim 16, the operations further comprising:
determining a confidentiality level of information contained in packets being communicated to UEs;
selecting between using the first VLC AP or using the second VLC AP and the third VLC AP to communicate with the UEs based on the determined confidentiality level of information; and
responsive to selecting between using the first VLC AP or using the second VLC AP and the third VLC AP, controlling the first VLC AP, the second VLC AP, and the third VLC AP.

* * * * *